United States Patent [19]

Hoshikawa

[11] Patent Number: 5,345,474
[45] Date of Patent: Sep. 6, 1994

[54] TEMPORARY ADDRESS SYSTEM IN A RADIO COMMUNICATION SYSTEM

[75] Inventor: Toshiya Hoshikawa, Sendai, Japan

[73] Assignee: Small Power Communication Systems Research Laboratories Co., Ltd., Sendai, Japan

[21] Appl. No.: 126,010

[22] Filed: Sep. 24, 1993

Related U.S. Application Data

[63] Continuation of Ser. No. 771,186, Oct. 4, 1991, abandoned.

[30] Foreign Application Priority Data

Oct. 4, 1990 [JP] Japan .................................. 2-265014

[51] Int. Cl.$^5$ ........................... H04B 1/38; H04L 5/16
[52] U.S. Cl. ....................................... 375/7; 455/33.1; 455/34.1; 370/95.1; 375/59
[58] Field of Search .................. 375/7; 455/33.1, 34.1, 455/54.1; 370/95; 379/59

[56] References Cited

U.S. PATENT DOCUMENTS

| | | | |
|---|---|---|---|
| 5,051,989 | 9/1991 | Negishi | 370/95.3 X |
| 5,073,971 | 12/1991 | Schaeffer | 455/33.1 |
| 5,081,704 | 1/1992 | Umeda et al. | 370/95.3 X |
| 5,111,534 | 5/1992 | Benner | 455/33.2 |
| 5,124,985 | 6/1992 | Hoshikawa | 455/34.1 X |
| 5,127,100 | 6/1992 | D'Amico et al. | 455/33.1 |

OTHER PUBLICATIONS

40th IEEE Vehicular Technology Conference, May 6, 1990, pp. 270–275, S. Onoe, et al., "Control Channel Structure for TDMA Mobile Radio Systems".
Patent Abstracts of Japan, vol. 14, No. 414(E-975), Sep. 7, 1990, & JP-A-21 59 837, Jun. 20, 1990, N. Hoshikawa, "Digital Frame Constitution Method for Portable Radio Equipment".
IEEE Transactions of Communications Technology, vol. 34, No. 1, Jan. 1986, pp. 31–37, Inder S. Gopal, et al., "Dynamic Address Assignment in Broadcast Networks".
Proceedings of the IEEE, vol. 75, No. 4, pp. 436–477, Apr. 1987, Donald C. Cox, "Universal Digital Portable Radio Communications".

*Primary Examiner*—Stephen Chin
*Assistant Examiner*—Bryan Webster
*Attorney, Agent, or Firm*—Oblon, Spivak, McClelland, Maier & Neustadt

[57] ABSTRACT

According to the temporary address system in the radio communications system of the present invention, as a temporary address data, an identification number determined based on the number of repeated zones in which the pattern of the same frequency is repeated, is assigned to a radio base station, and a temporary identification number, which is valid temporarily in the area of the base station is assigned to a terminal device. Real address data, which corresponds to said temporary address data, and is used to specify a terminal device, is stored in a not-yet-used transmission data field during traffic of control data, which is conducted for setting up a radio link between a base station and a terminal device, and is transmitted. Thus, in the radio communication system, using an address field having a limited number of bits, more number of terminal devices than that is possible with the bit length, can be used in the area of a base station.

9 Claims, 6 Drawing Sheets

F : BIT AND FRAME SYNC FIELD
FC : FRAME COUNT FIELD
A : ADDRESS FIELD
C : CONTROL FIELD
I : TRANSMISSION DATA FIELD
FCS : FRAME CHECK AND CORRECT SEQUENCE FIELD

F : BIT AND FRAME SYNC FIELD
FC : FRAME COUNT FIELD
A : ADDRESS FIELD
C : CONTROL FIELD
I : TRANSMISSION DATA FIELD
FCS : FRAME CHECK AND CORRECT SEQUENCE FIELD

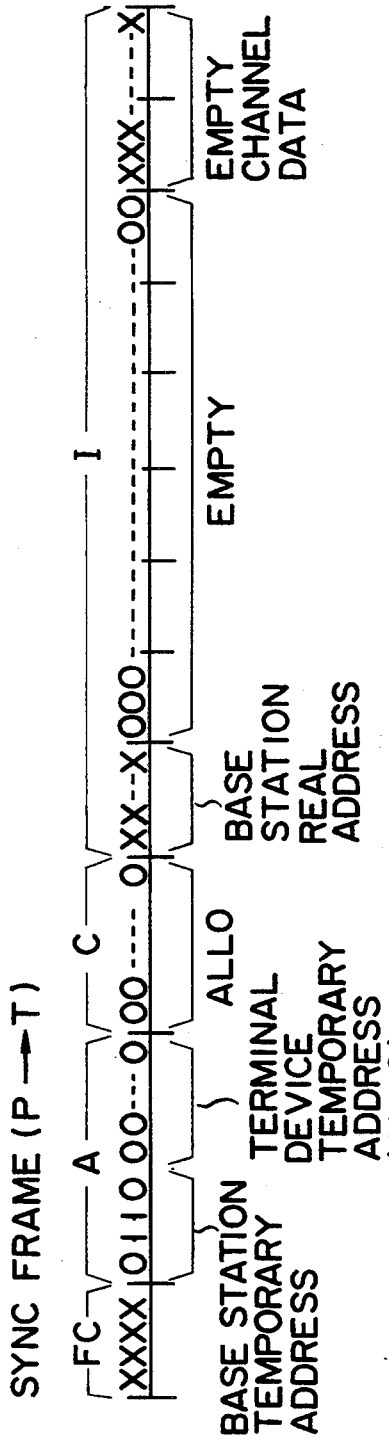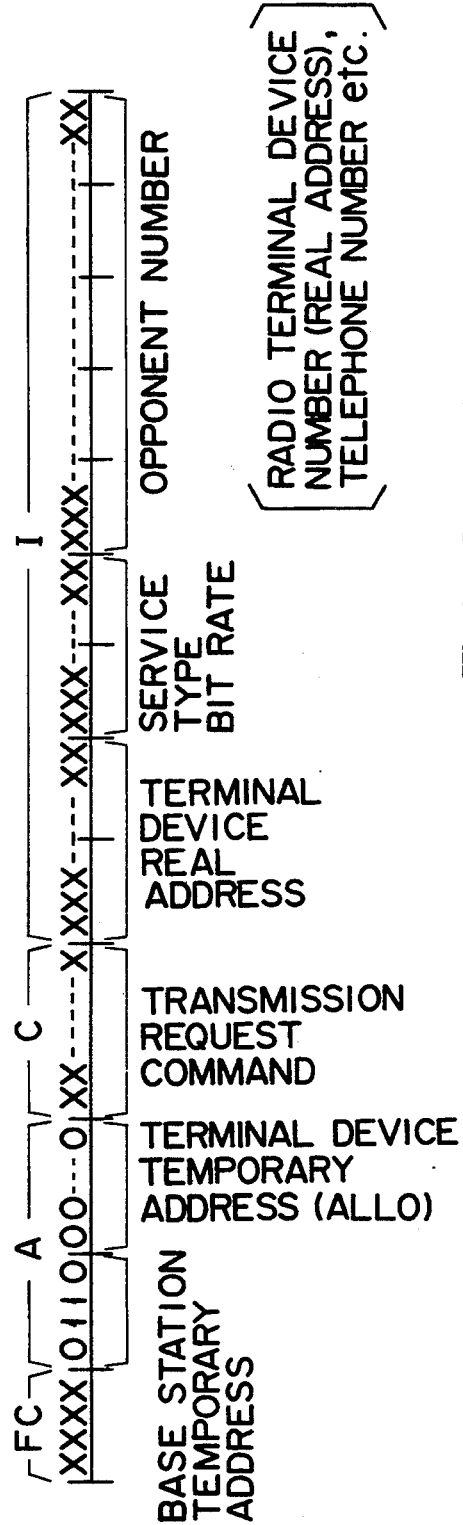

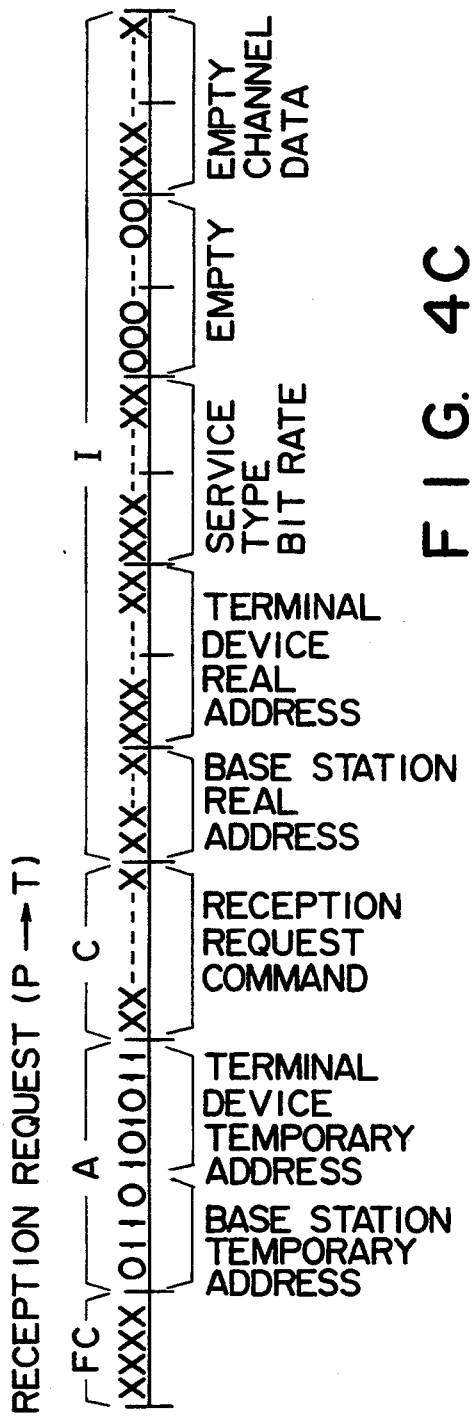
F I G. 4C
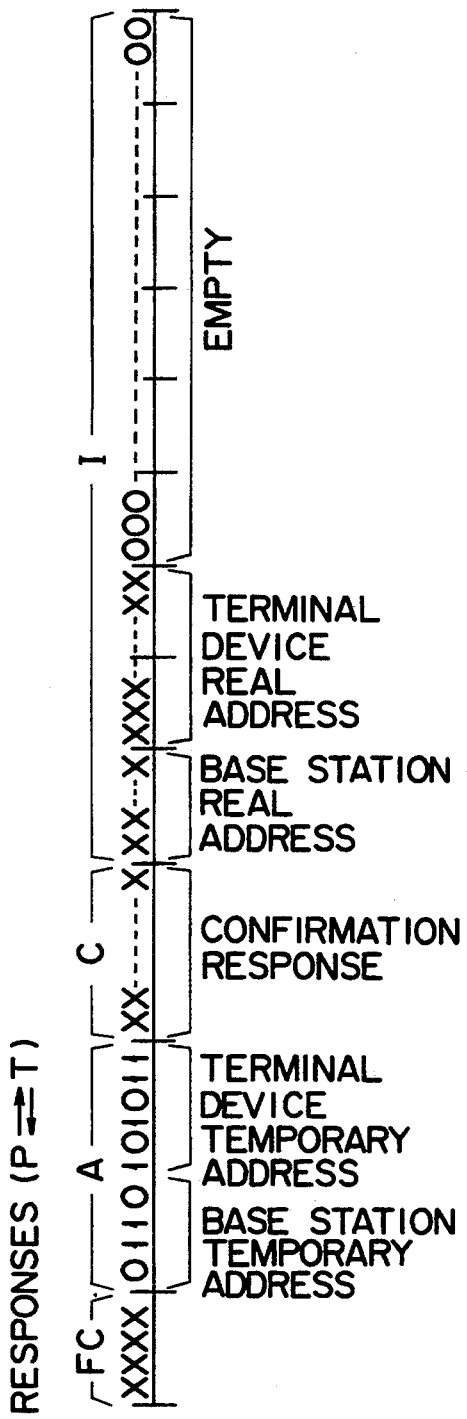
F I G. 4D

TEMPORARY ADDRESS SYSTEM IN A RADIO COMMUNICATION SYSTEM

This application is a Continuation of application Ser. No. 07/771,186, filed on Oct. 4, 1991, now abandoned.

BACKGROUND OF THE INVENTION

1. Field of the Invention

The present invention relates to a radio communication system in which its operation is carried out by a digital frame, and more specifically to an address assigning system for the address field of a digital frame, which is based on the technical idea of the HDLC (high-level data link control procedure).

2. Description of the Related Art

In general, communications among a number of transmitting/receiving devices by radio are conducted in accordance with a protocol called the communication control procedure so that data communication between transmitting/receiving devices, in this case, a base station and a terminal device such as a radio transceiver, can be properly performed, To carry out transfer of data efficiently in accordance with this communication control procedure, a common transmission control procedure which is used among the transmitting/receiving devices should be determined in advance. Here, there have been proposed radio communication systems in which the technical idea of the high level data link control procedure (HDLC), one of the transmission control procedures, is employed.

U.S. Pat. No. 5,124,985 (Dec. 6, 1989) entitled "Radio Communication System using Time Division Digital Frame", is one of the prior art documents related to the radio communication system of the present invention.

The present radio communication system operates in accordance with the idea of the HDLC transmission procedure, and its frame structure is formed based on the technical idea of the HDLC. In the radio link through which data transmission is carried out by radio between a radio terminal device and a base station, when data is transmitted via a high-speed digital code, the frame length must be fixed so as to realize time division multi-channels and correct errors with error control codes. Further, in order to enhance the efficiency of transmission, it is required that a target field designed for data transmission should be enlarged as much as possible, and other fields should be reduced as small as possible. As a result, the number of bits used in the address field is very much limited. When the number of base stations and radio terminal devices increases more than the capacities in the address field, identification of base station and radio terminal devices cannot be carried out any longer.

SUMMARY OF THE INVENTION

The present invention has been proposed in consideration of the above, and the purpose thereof is to provide a temporary address system of a radio communication system, in which even if there are more radio terminal devices and base stations than the limit caused by the number of bits in the address field, each of the devices and stations can be distinguished from the other to be identified, thereby enabling communications therebetween.

To solve the above-described problem, in the present invention, a temporary address number, which is a number determined based on the repetition zone number corresponding to the repeated pattern of a frequency signal, is assigned, as its base station identification data, and a repeatedly used temporary number is assigned to the radio terminal devices, as its terminal identification data. It should be noted here that when communication of control data is performed for the first time to set up a radio link between a radio terminal device and a base station, the transmission data field is in the "EMPTY" state; therefore this field is utilized to transmit an address number (real address), which occupies many bits and is unique to that radio terminal device or base station, back and forth between the device and station.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 4A-4D illustrate examples of data structures in a frame according to the invention, when transmission and reception of a signal is actually carried out.

DETAILED DESCRIPTION OF THE PREFERRED EMBODIMENTS

Embodiments of the present invention will now be described in detail with reference to accompanying drawings.

Figure 1:
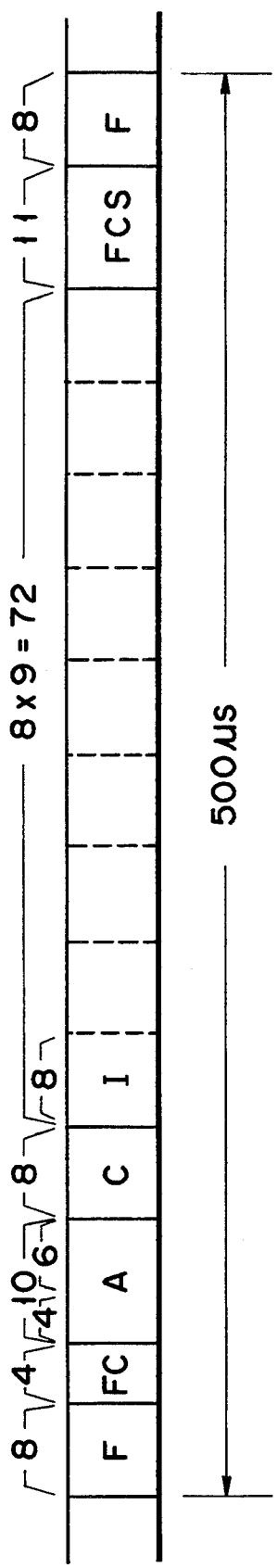
FIG. 1 shows an embodiment of a frame structure for transmitting digital code data by radio, according to the present invention.

FIG. 1 shows a structure of a frame used in radio communications between a radio base station and radio terminal device, according to an embodiment of the present invention. This embodiment is an example of a frame structure formed based on the technical idea of the HDLC, which is designed for transmitting digital code data by radio.

In this frame structure, bit and frame sync field F, frame count field FC, address field A, control field C, transmission data field I, and frame check and correct sequence FCS, are arranged in the mentioned order. In FIG. 1, the number of bits of each of the blocks of the frame is indicated on the block.

The time period for a cycle of the frame is set to 500 $\mu$s, and Fire codes are used as the error correction codes (m=4, length of code=105, data bit number=64, burst error within 4 bits, which is the limit of the error correction ability).

The correction range which can be covered by the error correction codes is the entire block except for the bit and frame sync field F. The total bit number of one frame is 121, and the transmission speed (bit rate) of the case where time-division-use of the frame is not performed, is 242 Kbits/sec. Further, other block codes, convolution codes or the like can be used as error correction codes. In this case, however, code length, error correction ability, and the like should be different from those of the above-mentioned. It should be noted that the above-described frame is used in transmissions in both directions, i.e., from a base station to a terminal device, and vice versa.

The function and structure of each of the blocks of the frame will now be explained.

a) The bit and frame and is sync field F is provided at the beginning and end of a frame, designed to indicate the start and completion of the frame (the field F at the end may be omitted in some cases). In this embodiment, the field F is assigned with "01111110" (flag); however other types, for example, combination of a bit synchronization pattern (such as "1010...") and a frame synchronization pattern (such as PN code), can be also used.

b) The frame count field FC contains a code designed to indicate the chronological order from a start frame, which is arbitrary, and this code is periodically repeated.

In this embodiment, this field FC is set to be 16 time-divided channels, and 4 bits are used for indicating a channel number. This channel data is thrown into the transmission frame transmitted from a base station to a radio terminal device by a base station apparatus, so as to indicate the channel number (binary code) of the frame. With this channel data, a radio terminal device can identify the channel to use. This time-division channel number can be arbitrary; however the bit number of the frame count field should be of one with which the channel number thereof can be indicated.

c) Regarding the above-stated address field A, a space (block), originally, is a section for storing the address of an opponent station or self station; however, in this embodiment, the 10 bit block is divided into two, and the first 4 bit section is used for the base station, and the last 6 bit section is used for the radio terminal device. A ratio of bits between a base station and radio terminal device is arbitrary, and can be set in accordance with the mode of the system used.

The first 4 bit selection is the identification number of the base station, which is determined based on the number N of repeated zones, where a frequency (or a frequency group) is repeatedly used. A zone is an area in which transmission and reception of a signal can be carried out by a single frequency (or a frequency group when several frequencies are used in a zone), and the number N of repeated zones indicates how many frequency (or frequency-group) repeated zones groups there are in a block. As will be stated later, the zones are arranged such that no zones of the same frequency stand adjacent with each other.

Figure 2A:
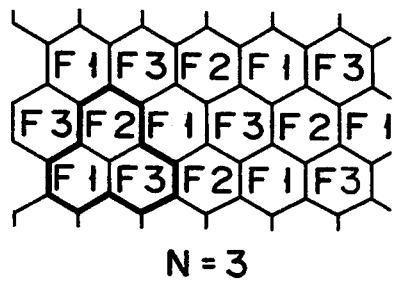
FIGS. 2A-2D illustrate examples zones divided based on repetition pattern of a frequency (or frequency group) assigned to each of the base stations.
Figure 2B:
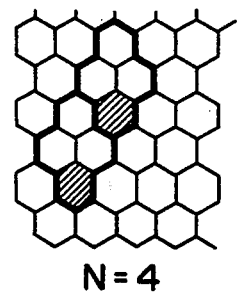
Figure 2C:
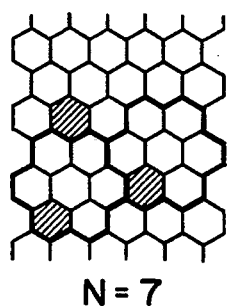
Figure 2D:
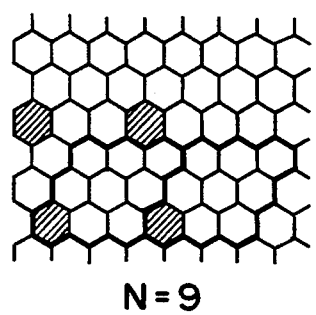

FIG. 2A shows an example of an arrangement of zones in the case where the shape of the zones is hexagon (it can be circular), and there are three different frequencies (or frequency groups), i.e., the number of zones is 3. In this figure, F1, F2, and F3 are the three different frequencies, and are arranged such that the same frequency zones are not located next to each other in the arrangement. Each of FIGS. 2B, 2C, and 2D is an example of an arrangement pattern when the number N of zones is 4, 7, or 9, respectively. Besides these examples, many more patterns can be considered, for example, the case where the number N of zones is 12, 13, 16, or 19. Further, there are many more zone arrangements other than what are shown in these figures, for example, a group of circular (hexagonal) zones can be divided into several sectors.

Figure 2E:
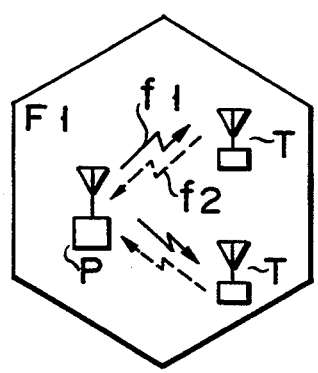
FIG. 2E shows a structure of a system including a base station and a radio terminal device.

FIG. 2E shows that there are a base station P in a base station area using a frequency group F1 which includes $f_1$ and $f_2$ in a zone, and at least one movable radio terminal devices T.

This embodiment is designed for assigning the identification number of a base station in accordance with the number of zones, and the following explanation is based on the case where N=7.

That is, the frequencies (frequency groups), F1, F2, F3 ... F7 are assigned to codes "001" to "111" (excluding "000") using 3 bits of the first 4 bits.

In the meantime, the above-mentioned zones are arranged not only two-dimensionally, but also three-dimensionally as in the case where the system is used in a tall building. Thus, in some cases, those repeated patterns cannot work due to the positional restrictions such as above; therefore the last 1 bit of the first 4 bits, which is left unused, is used to add another necessary frequency (or frequency group) for extension.

On the other hand, the last 6 bits are used as a temporary identification number (temporary address) of a radio terminal device, which is registered/erased every time a radio link is set in the base station. Using 6 bits (except for all "0's"), 63 radio terminal devices can be classified and identified at the same time.

Further, with 6 bits, the number of radio terminal devices which can be used at one time is limited to 63; however the number of terminal devices located within a zone is not limited.

Thus, according to the present invention, the number of base stations, and terminal devices which can be used in a system is not limited by the number of bits of the address field A.

Real addresses of base stations and terminal devices would often occupy many bits when they are used in a large system. When the first communication for exchanging control data is conducted to set a radio link between a base station and a terminal device, the transmission data field I contains no data and is not yet used; therefore a space of the field I is used as one, for storing each of these real addresses for mutual data communications.

In this embodiment, upon transmission of signals in both directions, i.e. from a base station to a terminal device, and vice versa, the address field A contains the data of both base station and terminal device; however, there are methods of communications, in which an address field carries only the data of either side.

d) The above-described control field C is a control block for controlling communications and data transmission between a base station and terminal device. This control field C is used by methods in accordance with, or based on the aforementioned HDLC.

e) The above-stated transmission data field I contains a bit sequence of data to be transmitted, and includes 9 blocks each consisting of 8 bits (1 byte). Consequently, when digital data is transmitted using all of the 9 data blocks of the transmission data field I for each of all 16 channels (time-division of a channel is not conducted), the data transmission speed is given by 8 bits×9 blocks/500 μs=144 Kbit/sec.

This data transmission speed of 144 Kbit/sec satisfies 2B+D (64 Kbit/sec×2+16 Kbit/sec=144 Kbits/sec) standardized as the international standard interface in the integrated services digital network (ISDN). Here, one of the 9 data blocks corresponds to the D channel.

As a specific example to which the present invention is applied, for example, when 64 Kbit/sec×2=128 Kbit/s (B channel) is used for transmission and reception of motion image and voice signals, and 16 Kbit/sec (D channel) is used for transmission and reception of a still image signal, the operations for all of the motion image, voice, and still image signals are carried out at the same time.

Further, the standard transmission speed in a general data transmission via, for example, a telephone line, is 64 Kbit/sec. In order to set the transmission speed to 64 Kbit/sec, 8 channels out of 16 are used, and the number of blocks of the data field used by all of the 8 channels is made to total 64. With this structure, the block of the D channel, which has not yet been used, is used to perform, for example, transmission and reception of control data between the base station apparatus and a terminal device, or data transmission between terminal devices.

In the case where transmit data as of voice or the like, which is band-compressed to have the transmission speed of 8 Kbit/sec, is transmitted, it is possible to conduct it by only one channel. The D channel is of 1 Kbit/sec, which corresponds thereto, and on this D channel, other data, etc. can be transmitted at the same time.

As described, data transmission performed at the transmission speed of 144 Kbit/sec or less can be obtained by using an arbitrary number of channels out of 16. In this case, the data transmission speed per one channel is 8 Kbit/sec+1 Kbit/s. It should be noted that when two or more channels are used to high-speed transmit a single piece of data, the channels must be time-consecutive.

f) The above-described frame check and correct sequence field FCS is a block for detection and correction of transmission errors, and Fire codes are used in this embodiment.

A burst error of 4 bits or less can be corrected in all the digital data (105 bits) except for the bit and frame sync field F.

The following is an explanation of an example of usage of the above-mentioned temporary address.

In this example, at least a pair of different frequencies $f_1$ and $f_2$ are required for a radio link between a base station and a radio terminal device, transmission from a base station to a terminal device, and vice versa.

The number of pairs of frequencies depends on the number of radio terminal devices in the zone covered by a base station, the bit rate used, and the number of use.

Figure 3A:
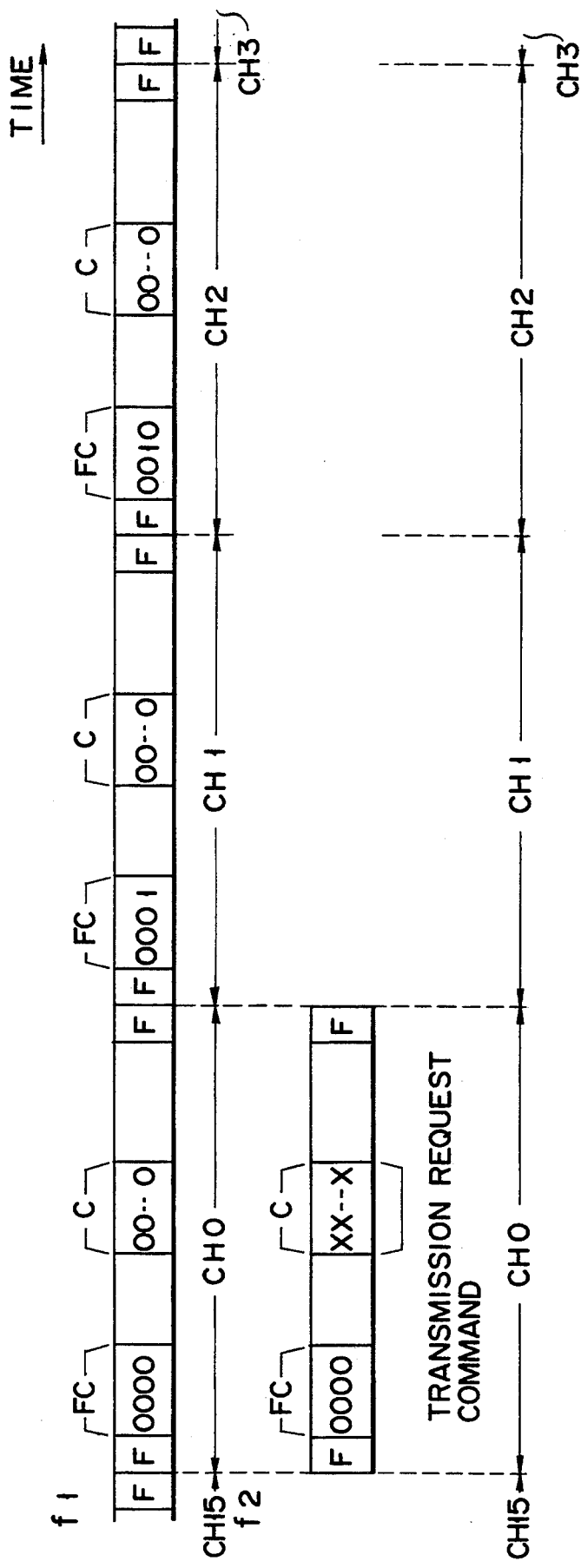
FIGS. 3A and 3B illustrates examples of transmission and reception of a signal in a time division digital frame according to the present invention.
Figure 3B:
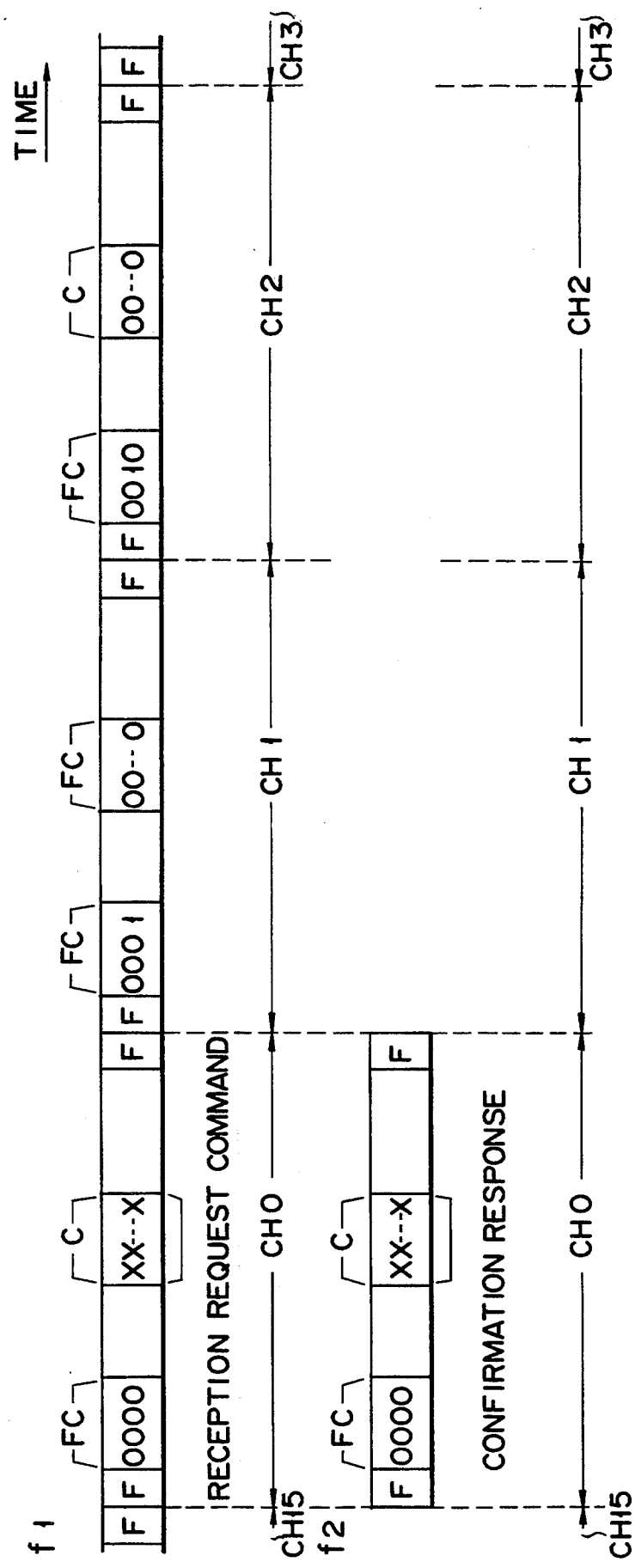

FIG. 3A shows frame structures in the case where a radio terminal device requests transmission of a signal (request to originate a call) to a base station, and the case where a base station accepts reception of a signal from a radio terminal device, using these frequencies $f_1$ and $f_2$ on channel 0. FIG. 3B shows the case where a base station requests reception of a signal (request to terminate a call) to a radio terminal device, and the terminal device accepts it. FIGS. 4A–4D illustrate an example of control data contained in each of such frames, along with a base station P and a radio terminal device T.

For the radio terminal device T to start communications with the base station P from the device T's side, it is first required that synchronization of the bit and frame should be carried out. Therefore, the base station P should be transmitting the sync frame of frequency $f_1$ all the time in unused channels. In connection with this, straight "0" in the control field C, as shown in FIG. 4A, indicates that it is used as a sync frame.

For the radio terminal device T to request transmission of a signal from its side, empty channel data contained in the sync frame of frequency $f_1$, or an empty channel of frequency $f_2$ is directly detected, and using the detected empty channel, the device T requests the base station P to transmit a signal (to originate a call). In this case, this empty channel data is set to "000 . . . 0", and the 16 channels are all empty. The radio terminal device T is suppose to use the channel 0 to conduct a transmission request. Upon request of transmission, a transmission request command is stored in the control field C as shown in FIG. 3A to perform transmission request with respect to the base station P. FIG. 4B shows an example of control data of the frame in this case, where "X" designates either "0" or "1".

After the aforementioned radio terminal device T transmits a transmission request frame shown in FIG. 4B to the base station P, necessary control data communications are conducted between the terminal device T and the base station P, and then data transmission is performed by the transmission data field.

On the other hand, when the base station P requests the terminal device T to receive the signal, (to terminate a call) a temporary address, and a reception request command (shown in FIG. 4C) are stored in the address field A of the frequency $f_1$, the control data field C, respectively, and a radio terminal device number, which is a real address, area stored in the transmission data field I so as to conduct reception request with respect to a desired terminal device T. Upon request of reception, the terminal device T carries out a collation with the real address, the identification number of itself. If they agree with each other, the terminal device responds to the request (see FIG. 3B and FIG. 4D), and then carries out data transmission after necessary control data communications are completed.

Assignment of temporary addresses to the base station P and the terminal device T is be carried out in, for example, the following manner.

In this example, the first 4 bits of the address field are used as a temporary address portion for the base station, and the last 6 bits are used as a temporary address portion for the terminal device. The temporary device of the base station is set to "0110", and that of the terminal device T is set to "101011". The real addresses of the base station P and the terminal device T are represented in 8 bits (1 byte) and 16 bits (2 byte) in this example; however, as long as all the base stations and all the radio terminal devices can be identified, any number of bits can be assigned.

The sync frame shown in FIG. 4A does not require the temporary address of a terminal device T, and the transmission request shown in FIG. 4B is carried out prior to assignment of a temporary address by a base station P. In both cases, all the bits in the temporary address portion of the terminal device T is set to "0". Also, in this example, upon request of transmission or reception, types of services and bit rates are expressed in 2 bytes, but whether or not data is assigned, a method for indicating contents, and the number of bytes, etc.

can be arbitrarily determined. Further, all of these data cannot be transmitted at one time, they may be divided into two times.

In the control data communications before setting of a radio link for the transmission of target informations, both base station P and terminal device T set up a communications method in which communication method are carried out while confirming responses from each other as in the half-duplex communications method, and the same data is repeatedly transmitted until the opponent responds. Therefore, the receiver can make sure of reception of the data without failure because of this repeated signal transmission. Thus, a highly accurate data communications method for transmitting and receiving a signal can be achieved.

FIG. 3 shows the case where there are a pair of carrier frequencies $f_1$ and $f_2$; however, depending on the traffic amount, other carrier frequency pairs ($f_3$, $f_4$, ... $f_{2n}$) can be used for transmission and reception of signals between the base station P and a radio terminal device T. In this case, control data communications for setting a radio link between the base station P and a terminal device T are conducted by use of the frequencies $f_1$ and $f_2$.

Assignment of the frequency pairs for actual data transmission/reception into channels is carried out in the order from the $f_3$ and $f_4$, excluding the frequencies $f_1$ and $f_2$. This is because the frequencies $f_1$ and $f_2$ are made to serve as a control channel, and therefore only these frequencies need to be monitored in order to check transmission and reception of signals of both the base station P and the radio terminal device T. As an example of such a method, the control channel may be made into an exclusive one by limiting the channel to a part of the 16 channels, for example, the first 4 channels.

The frequencies $f_1$ and $f_2$ can be used as both control channel and data transmission channel for general communications, and so can be the other frequency sets.

Therefore, if some error occurs in the set of frequencies $f_1$ and $f_2$, the role of this control channel can be passed on to the pair of carrier frequencies $f_3$ and $f_4$, thereby achieving a highly reliable system.

The last one of the 9 data blocks of the transmission data field I is designed to correspond to the D channel, and is used to conduct traffic of control data between the base station P and a radio terminal device T, or transmission of other data between the terminal devices T. In other words, by using a D channel, traffic between a terminal device T and a base station P can be conducted even in the middle of a general communication or data transmission. Consequently, traffic of data for switching zones or other control data can be easily conducted.

As described, the present invention relates to address data in a radio link between a base station and a terminal device in the case where a high-speed digital code is used. The frame of a time-division digital radio link is restricted in terms of its fixed length and the number of bits of its address field.

Small zone type movable radio systems, to which the present invention is generally applied, is expected to develop greatly in the feature; therefore these systems are likely to be constructed into a great-scale system. When such a large-scale system is realized, much more bits are required to express an address with the conventional techniques than the present invention. In the present invention, a temporary address is assigned to a base station and a radio terminal device; therefore the number of bits does not become so large.

Further, the radio terminal device of the present invention has an interface connectable to the ISDN, and therefore can be connected to a general communications network to construct a system, where release from restriction of the bit length of an address is particularly significant.

Thus, according to the present invention, there is provided a temporary address system in a radio communications system in which many radio terminal devices and base stations, communications being conducted therebetween, can be classified and identified with a limited number of bits of an address field.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A temporary address system in a radio communication system comprising:

frame for transmitting the stored digital code data by radio of one of a frequency out of a frequency group, said frame means including a bit and frame sync field, frame count field, address field, control field, transmission data field, and frame check and correct sequence field;

a radio base station forming an area to/from which said digital code data stored in said frame can be transmitted/received; and at least one portable radio terminal device for conducting transmission and reception of a signal with respect to said radio base station in said area;

wherein said radio base station registers a temporary address for a terminal device every time a radio link is set upon either transmission request from a terminal device, or reception request from the radio base station, and erase the temporary address after completion of communications, and a temporary identification data is assigned to an address field of said frame, and the temporary identification data is repeatedly set to the radio terminal device with which the radio link is formed.

2. A radio system using a temporary address system comprising:

frame for transmitting a stored digital code data by radio of a plurality of frequencies or a plurality of frequency groups, said frame including a bit and frame sync field, frame count field, address field, control field, transmission data field, and frame check and correct sequence field; and zones each formed of a radio base station forming an area to/from which said digital code data stored in said frame means can be transmitted/received, and at least one portable radio terminal device for conducting transmission and reception of a signal with respect to said radio base station in said area, a frequency group is assigned to each of the zones, wherein said zones are made into a group in which areas of frequencies are arranged such that areas of the same frequency group are not located adjacent to each other, and said radio base station registers a temporary address for a terminal device every time a radio link is set upon either transmission request from a terminal device, or reception request from the radio base station, and erase the temporary address after completion of communications.

3. A radio system according to claim 2, wherein when the radio link is set between the terminal device and its base station in each of these zones, and between the base stations of these zones, the link is formed and the link between the base stations may also be formed through other communications networks.

4. A radio system according to claim 2, wherein a real address for specifying said base station and said terminal device, corresponding to said temporary identification data, is stored in the transmission data field of each of said station and device upon setting of the radio link, and transmitted to each other.

5. A radio system according to claim 2, wherein said address field includes a plurality of bits, a predetermined number of which indicates the temporary address of the radio base station and the rest of the bits indicates that of the terminal device.

6. A temporary address system in a radio communication system, comprising:
   a plurality of zones, each of which has at least one radio terminal device in an area of a radio base station for transmitting/receiving a signal, said plurality of zones being grouped such that areas of a same frequency are not arranged adjacent with each other, thereby the same frequency is repeatedly used; and
   an address field which stores identification data of a radio base station and radio terminal device, said address field being located in a frame for transmitting digital code data by radio; and wherein
   data based on the number of zone groups is assigned to said address field as the identification data of the radio base station.

7. A temporary address system in a radio communication system, comprising:
   a plurality of zones, each of which has at least one radio terminal device in an area of a radio base station for transmitting/receiving a signal, said plurality of zones being grouped such that areas of a same frequency are not arranged adjacent with each other, thereby the same frequency is repeatedly used; and
   an address field which stores identification data of a radio base station and radio terminal device, said address field being located in a frame for transmitting digital code data by radio; and wherein
   temporary identification data of a radio terminal device, which is effective only when a radio link is constituted between the radio base station and the radio terminal device, is assigned to said address field as the identification data of the radio terminal device.

8. A temporary address system in a radio communication system according to claim 6, wherein a real address data of the radio base station is stored in a target field which is designed for transmitting data while setting a radio link, and then transmitted.

9. A temporary address system in a radio communication system according to claim 7, wherein a real address data of the radio terminal device is stored in a target field which is designed for transmitting data while setting the radio link, and then transmitted.

* * * * *